United States Patent [19]

Hsu

[11] Patent Number: 5,704,027
[45] Date of Patent: Dec. 30, 1997

[54] APPARATUS FOR GENERATING GRAPHIC COORDINATES FOR SCAN TYPE GRAPHIC DISPLAY

[75] Inventor: Jerry Hsu, Yun-Lin-Shan, Taiwan

[73] Assignee: United Microelectronics Corporation, Hsin-Chu, Taiwan

[21] Appl. No.: 505,577

[22] Filed: Jul. 21, 1995

[51] Int. Cl.$^6$ .................................................. G06T 3/00
[52] U.S. Cl. ................................................................ 395/133
[58] Field of Search ................................. 395/133–139; 348/580–583; 345/127–131

[56] References Cited

U.S. PATENT DOCUMENTS

| | | | |
|---|---|---|---|
| 4,752,828 | 6/1988 | Chapuis | 395/136 X |
| 4,754,270 | 6/1988 | Murauchi | 358/183 |

*Primary Examiner*—Almis R. Jankus
*Attorney, Agent, or Firm*—Barnes, Kisselle, Raisch, Choate, Whittemore & Hulbert, P.C.

[57] ABSTRACT

An apparatus for generating graphic coordinates for scan type graphic display comprises a horizontal and a vertical start position generators, a horizontal and a vertical step value generators, a horizontal and a vertical position registers, and a first and a second adders. The horizontal and vertical start position generators generate respectively graphics horizontal and vertical start positions corresponding to a screen scanning line. The horizontal and vertical step value generators respectively produce graphics horizontal and vertical step values corresponding to the screen scanning line. The horizontal and vertical position registers input and store the respective horizontal and vertical start positions and temporarily store the result from the first and the second adders correspondingly. The first adder adds the horizontal step value and the contents of the horizontal position register and then outputs the results to the horizontal position register. The second adder adds the vertical step value and the contents of the vertical position register and then outputs the result to the vertical position register.

2 Claims, 10 Drawing Sheets

| BIT 17 | BIT 16 | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 |
|---|---|---|---|---|---|---|---|---|---|---|---|---|---|---|---|---|
| | | | | | | XOFFSETBK[17:1] | | | | | | | | | | |

FIG.6A

| BIT 17 | BIT 16 | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 |
|---|---|---|---|---|---|---|---|---|---|---|---|---|---|---|---|---|
| | XOFFSETBK[17:9] | | | | | | | | | | VC[7:0] | | | | | |

FIG.6B

| BIT 17 | BIT 16 | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 |
|---|---|---|---|---|---|---|---|---|---|---|---|---|---|---|---|---|
| | | | | | | YOFFSETBK[17:1] | | | | | | | | | | |

FIG.7A

| BIT 17 | BIT 16 | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 |
|---|---|---|---|---|---|---|---|---|---|---|---|---|---|---|---|---|
| | YOFFSETBK[17:9] | | | | | | | | | | VC[7:0] | | | | | |

FIG.7B

APPARATUS FOR GENERATING GRAPHIC COORDINATES FOR SCAN TYPE GRAPHIC DISPLAY

FIELD OF THE INVENTION

The present invention generally relates to a method and apparatus for graphics composition and more particularly, relates to an improved method and apparatus for graphics composition utilizing a two-dimensional transformation device for transforming a screen coordinate into a graphics coordinate that includes position generators, step value generators, position registers and adders.

BACKGROUND OF THE INVENTION

The display of images of both text and graphics on a computer monitor is similar to the method used in a conventional TV monitor. A fluorescent screen is divided into many horizontal rows, i.e., approximately 240, where each row has a plurality of points or so-called pixels.

Graphics composition devices have been used in TV games in recent years to generate graphics on a TV screen. For instance, popular TV games are generated by using graphics processing devices such as the Nintendo FamiCom, the Sega MegaDrive and the NEC PC-ENGINE. In these graphics processing devices, the graphics is first stored in a video memory, the graphics data is read from the video memory by a graphics generator, converted to a video signal and outputted and displayed on a TV screen. In an actual video game system, there are approximately 240 horizontal scan lines wherein each scan line may have 320 pixels. Therefore, in order to display an image on a screen, a total number of 240×320 pixels must be processed. This is a very time consuming process and requires a large memory bank to store all the address information.

In most prior art graphics processing devices, the special functions of enlargement, reduction and rotation of graphics cannot be performed. Since these prior art systems are not equipped with hardware for achieving such special effects, they can only provide a limited number of changes in graphics in a computer game design. More extensive programming code or data is sometimes required which leads to a slower execution speed and consequently the demand for real time display cannot be met. As computer games are gaining more popularity, the demand for more varieties in games by the user increases dramatically. The more popular games are most likely the ones that contain a greater variety of changes in graphics.

In some prior art computer games, in order to improve the varieties of changes in the graphics, programming code for data is frequently added to the programs for the game. This leads to a problem that either the speed of the program cannot meet the demand of a real time display, or more memory is needed to store the resulting program and data, thereby increasing the cost of the game cartridge.

It is therefore an object of the present invention to provide a graphics composition method and apparatus that provides a large variety of changes in graphics without the shortcomings of the prior art methods.

It is another object of the present invention to provide a graphics composition method and apparatus that is capable of a large variety of changes in graphics by using a two-dimensional transformation apparatus and method.

It is a further object of the present invention to provide a graphics composition method and apparatus that utilizes a two-dimensional transformation method by incorporating additional hardware in the game system.

It is yet another object of the present invention to provide a graphics composition method and apparatus that utilizes a two-dimensional transformation method and additional hardwares such that the software programs for executing the same can be simplified.

It is still another object of the present invention to provide a graphics composition method and apparatus that utilizes a two-dimensional transformation method through additional hardware such that the memory space necessary to execute the program is reduced.

It is yet another further object of the present invention to provide a graphics composition method and apparatus incorporating a two-dimensional transformation method such that the execution speed of the software program can be improved.

It is still another further object of the present invention to provide a graphics composition method and apparatus incorporating a two-dimensional transformation method such that a two-dimensional screen position can be transformed into a graphics position and that the graphics data can be retrieved and displayed on a screen.

SUMMARY OF THE INVENTION

In accordance with the present invention, an improved method and apparatus for graphics composition is provided by utilizing a two-dimensional transformation method. The improved method and apparatus transforms a screen position into a graphics position instantly and retrieves the graphics data such that the graphics can be either enlarged, reduced or rotated on a screen display.

In the preferred embodiment, an improved method and apparatus for producing a graphics display by utilizing a two-dimensional transformation method such that a graphics image can be enlarged, reduced or rotated on a screen display is provided by using the following major components; a horizontal start position generator for generating a graphics horizontal start position corresponding to the starting point of a screen scanning line, a horizontal step value generator for generating a graphics horizontal step value corresponding to the desired horizontal step of a screen scanning line, a horizontal position register for inputting and storing the graphics horizontal start position and for the temporary storage of the results from a first adder, the first adder being provided for adding the horizontal step value and the current contents of the horizontal position register and outputting the results back to the horizontal position register for the next pixel, a vertical start position generator for generating a graphics vertical start position corresponding to a starting point of screen scanning line, a vertical step value generator for generating a graphics vertical step value corresponding to the desired vertical step of a screen scanning line, a vertical position register for inputting and storing the graphics vertical start position and for the temporary storage of the results from a second adder, the second adder being provided for adding the vertical step value and the current contents of the vertical position register and then outputting the results back to the vertical position register for the next pixel.

The present invention is further directed to an improved method and apparatus of composing a graphics image by utilizing a two-dimensional transformation method which can be carried out by the following steps:

1. At the start of each scanning line, inputting a respective graphics horizontal start position and graphics vertical start position, which correspond to a starting point of the scanning line, into a horizontal position register and a vertical position register, respectively;

2. At the increment of each graphics point (i.e., pixel) for each scan line, adding a horizontal pixel step value to the horizontal position register such that a new horizontal graphics position is established, and adding a vertical pixel step value to the vertical position register such that a new vertical graphics position is established; and, 3. According to the horizontal graphics position and the vertical graphics position (i.e., the graphic position coordinate X, Y), read a graphics datum and output such datum to the display unit.

BRIEF DESCRIPTION OF THE DRAWINGS

Other objects, features and advantages of the present invention will become apparent upon consideration of the specification and the appended drawings in which:

FIG. 6A is a simplified address bit format generated by an offset memory address formatter using a value XOFFSETBK from a first base register to retrieve an XOFFSETBK.

FIG. 6B is a simplified address bit format using XOFFSETBK and a vertical count VC indicative of a screen vertical scanning position to retrieve the XOFFSETBK.

FIG. 7A is a simplified address bit format using a value YOFFSETBK from a second base register to retrieve a Y-offset.

FIG. 7B is a simplified address bit format using YOFFSETBK and the vertical count VC to retrieve the Y-offset.

DETAILED DESCRIPTION OF THE PREFERRED EMBODIMENT

The present invention discloses a method and apparatus for producing a graphics composition by using a two-dimensional transformation method that includes the following major components: a horizontal and vertical starting position generator for producing a horizontal and vertical graphics starting position corresponding to a starting point of a screen scanning line; a horizontal and vertical step value generator for producing a horizontal and vertical step value corresponding to a desired horizontal and vertical step (i.e., slope) of a screen scanning line; a horizontal and vertical position resister for inputting and storing the horizontal and vertical graphics start positions and for temporarily storing the result from a first pair of adders wherein the first pair of adders are provided for adding the horizontal and vertical step values with the respective current contents of the horizontal and vertical position resisters, and then outputting the results to the horizontal and vertical position registers, respectively, for the next pixel.

The object of the present invention is to provide a graphics composition method and apparatus incorporating a two-dimensional transformation method through the support of hardware to simplify the programming of a game such that the memory space occupied by the program can be reduced and the speed of executing such program can be increased. The new graphics composition method can instantly transform a screen position into a graphics position such that the graphics data can be retrieved and can be instantly displayed on a screen.

The present invention therefore changes the sampling position in the graphics space corresponding to a screen scanning line and reflects such position onto a screen space. The graphics image is then shown based on the graphics data at the sampling position.

Figure 1A:
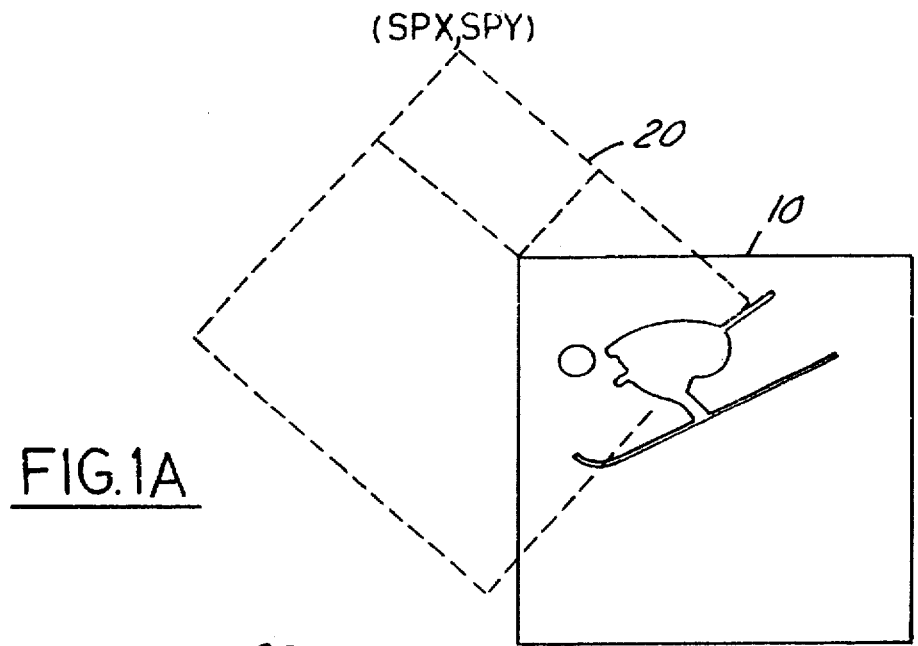
FIGS. 1A, 1B, and 1C are graphs illustrating the corresponding relationship between the graphics space and the screen space of the present invention.
Figure 1B:
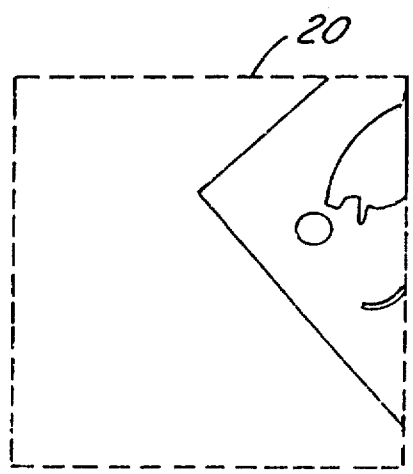
Figure 1C:
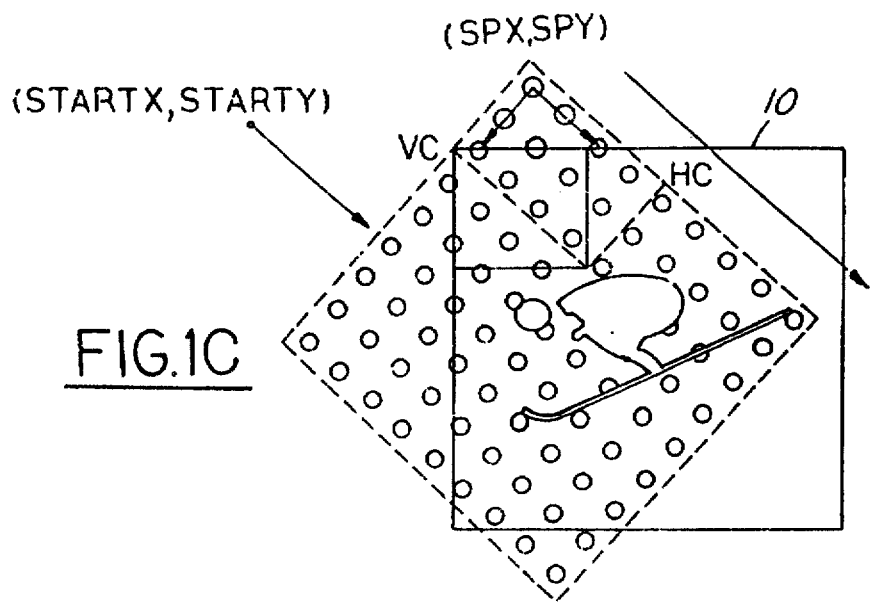

Referring initially to FIGS. 1A through 1C, the solid line in FIG. 1A indicates graphics space 10 and the dashed line indicates the screen space 20. FIG. 1B shows an image on the screen based on the corresponding relationship between graphic space 10 and screen space 20 shown in FIG. 1A. FIG. 1C shows a sampling point by a scanning line scanning through graphics space 10. The coordinates of SPX and SPY shown in FIG. 1A indicate the graphics position corresponding to the screen starting point (i.e., the upper leftmost portion of the screen, or, in other words, the starting coordinate of the first scan line). The coordinates STARTX and STARTY shown in FIG. 1C indicates the starting point of a scanning line in the graphics space. It is shown from FIGS. 1A and 1B that if the position of screen space 20 is changed, or, in other words, the position of the coordinates SPX, SPY in FIG. 1A and the direction of the scanning line in FIG. 1C are changed, a special effect of displacement and rotation will be shown in the graphics image on the screen. As shown in FIG. 1C, if the horizontal step value and the vertical step value of the sampling point of the scanning line in the graphics space is changed, a special effect of enlargement or reduction in a respective axis will be shown in the graphics image on the screen.

FIGS. 2A through 2G and FIGS. 3A through 3G illustrate the various special effects that can be achieved by the present invention. In FIGS. 2A through 2G, the graphics in the graphics space is shown. The solid line 10 indicates the graphics space while the dashed line 20 indicates the screen space. The graphs in FIGS. 3A through 3G illustrate the special effects shown on the screen corresponding to the graphs in FIGS. 2A through 2G.

Figure 2A:
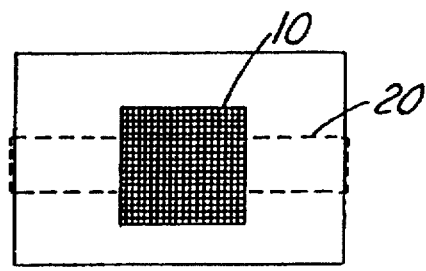
FIGS. 2A through 2G are graphs illustrating images in the graphics space.
Figure 3A:
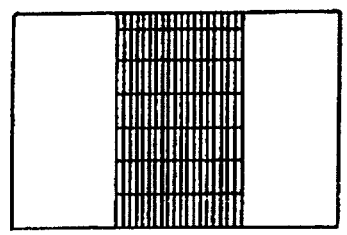
FIGS. 3A through 3G are graphs illustrating the screen graph display corresponding to FIGS. 2A~2G.
Figure 2B:
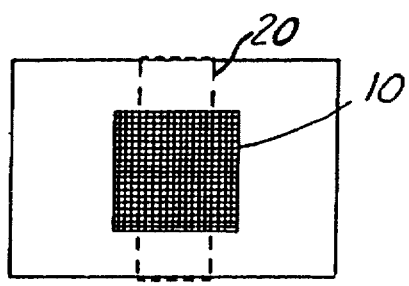
Figure 3B:
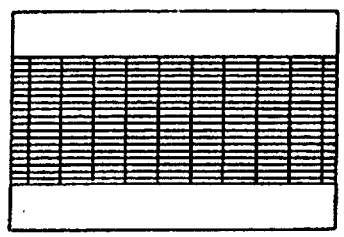
Figure 2C:
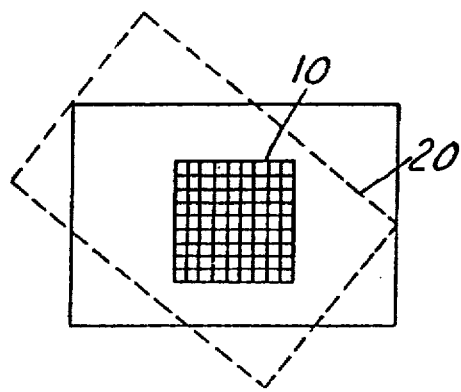
Figure 3C:
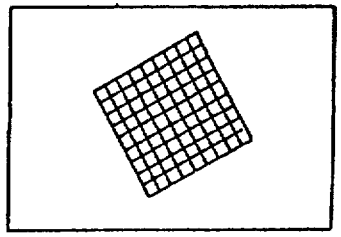

For instance, if the scan lines (in the screen space) are more dense in the Y direction, as shown in FIG. 2A, the resulting screen display of the image shown by the solid line in FIG. 2A will be that shown in FIG. 3A wherein the grids in the Y direction are enlarged. A similar effect of enlargement is shown in FIGS. 2B and 3B where the scan lines in the screen space are more dense in the X direction. FIG. 2C shows that the scan lines in the screen space are inclined which result in a rotated graphics on the screen display shown in FIG. 3C.

Figure 2D:
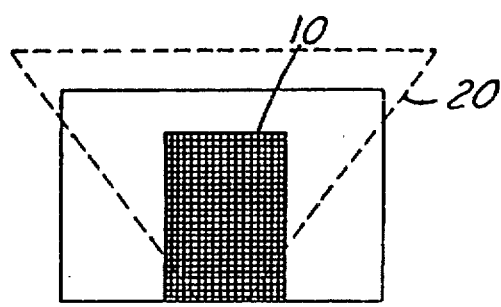
Figure 3D:
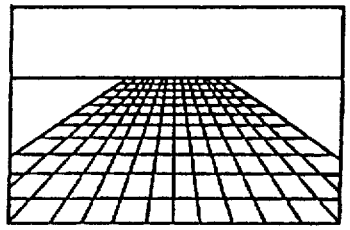
Figure 2E:
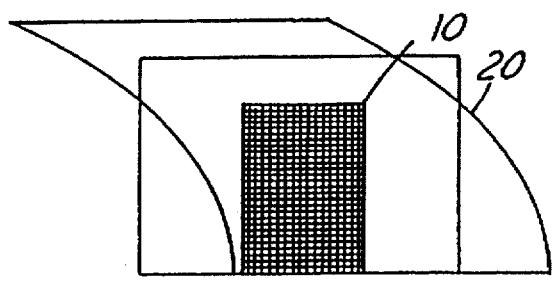
Figure 3E:
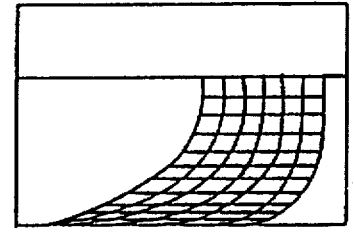
Figure 2F:
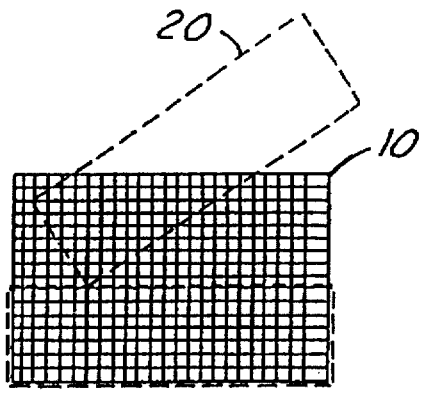
Figure 3F:
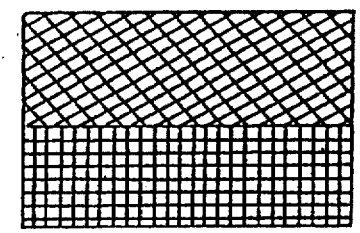
Figure 2G:
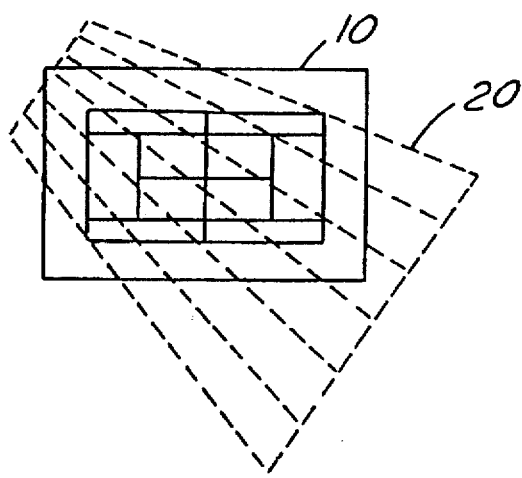
Figure 3G:
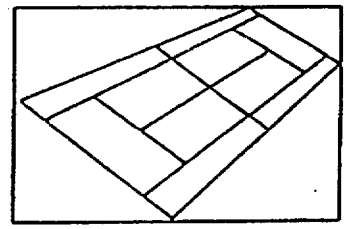

FIG. 2D shows another variation of changes in graphics by scanning a wider area on top and a narrower area at the bottom. This scanning results in a perspective view of the grid (reduced at top and enlarged at bottom) and an illusion of a 3-dimensional picture, as shown in FIG. 3D. A variation of wide, twisted scan lines 20 in the screen space as shown in FIG. 2E produced a correspondingly, reduced twisted screen display as shown in FIG. 3E. FIG. 2F shows yet another variation which is similar to that shown in FIGS. 2C and 3C, but only the top half of the grid is rotated by inclined scan lines 20 while the bottom half of the grid remains unchanged as shown in FIG. 3F. Aother variation in the graphics composition enabled by the present invention hardware is shown in FIGS. 2G and 3G. The scan lines 20 in the screen space are not parallelly spaced while inclined, which produces a correspondingly rotated, inclined and twisted graphics display on the screen representative of a 3-dimensional view.

Based on the present invention, if the output data from a horizontal start position generator and a vertical start position generator are changed, the graphics shown on the screen can be displaced. If the output of a horizontal step value generating device and a vertical step value generating device are changed, a special effect of rotation, enlargement or reduction of the graphics can be produced.

The two dimensional transformation method utilized by the present invention transforms a two dimensional screen coordinate into a graphics position coordinate by the following steps: (1) at the start of each scanning line, inputting a horizontal graphics start coordinate and a vertical graphics start coordinate, corresponding to the start point or position of a scanning line, into a horizontal position register and a vertical position register, respectively; (2) at the increment of each pixel of each scan line, adding incrementally a horizontal pixel step value to the horizontal position register to obtain a new horizontal position for the next pixel, adding a vertical pixel step value to the vertical position register to obtain a new vertical position for the next pixel; and (3) according to the horizontal graphics position and the vertical graphics position (i.e., the graphics position coordinate X, Y), read a graphics datum and output the datum to a display screen.

The horizontal graphics starting coordinate and the vertical graphics starting coordinate can either be calculated from data in a memory or be produced by an automatic accumulation (or generating) method.

In the method of automatic accumulation, the two dimensional transformation method can be performed by: (1) At the start of the first scanning line, inputting a graphics vertical start coordinate and a graphics horizontal start coordinate into a vertical start position register and a horizontal start position register, and (2) at each incremental scanning line, adding an automatic accumulation horizontal step value to the horizontal graphics start position, and adding an automatic accumulation vertical step value to the vertical graphics start position. These updated values are then loaded into the horizontal and vertical position registers, respectively.

Figure 4A:
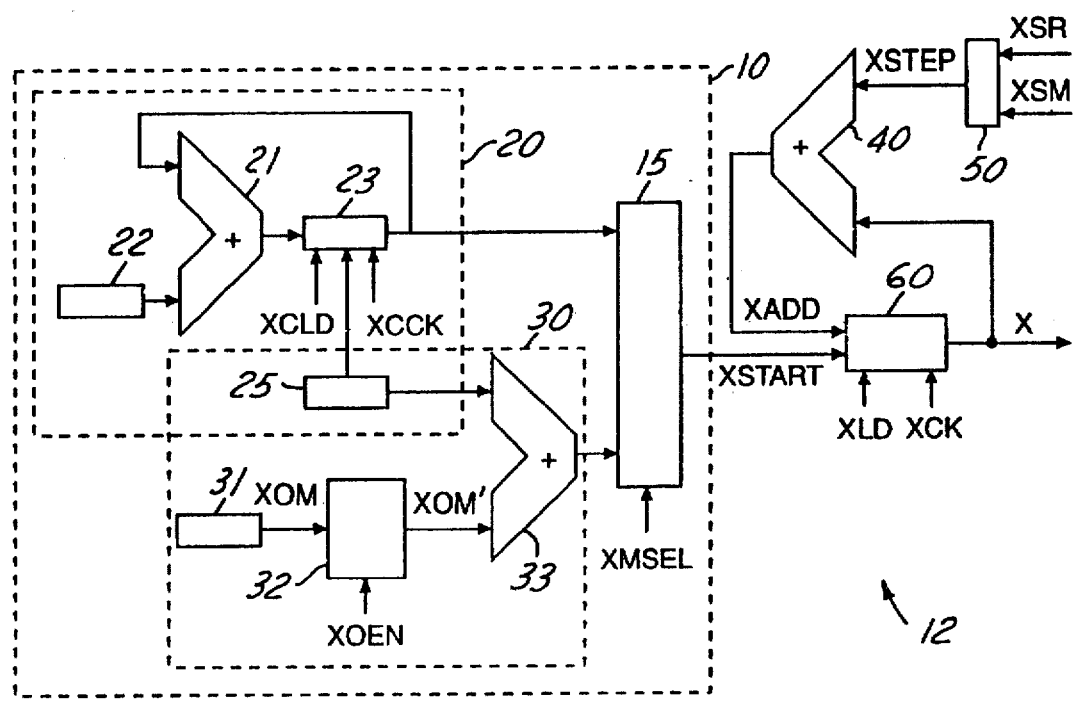
FIG. 4A is a block diagram illustrating the horizontal position transformation circuit of the two-dimensional transformation apparatus in accordance with the present invention.
Figure 4B:
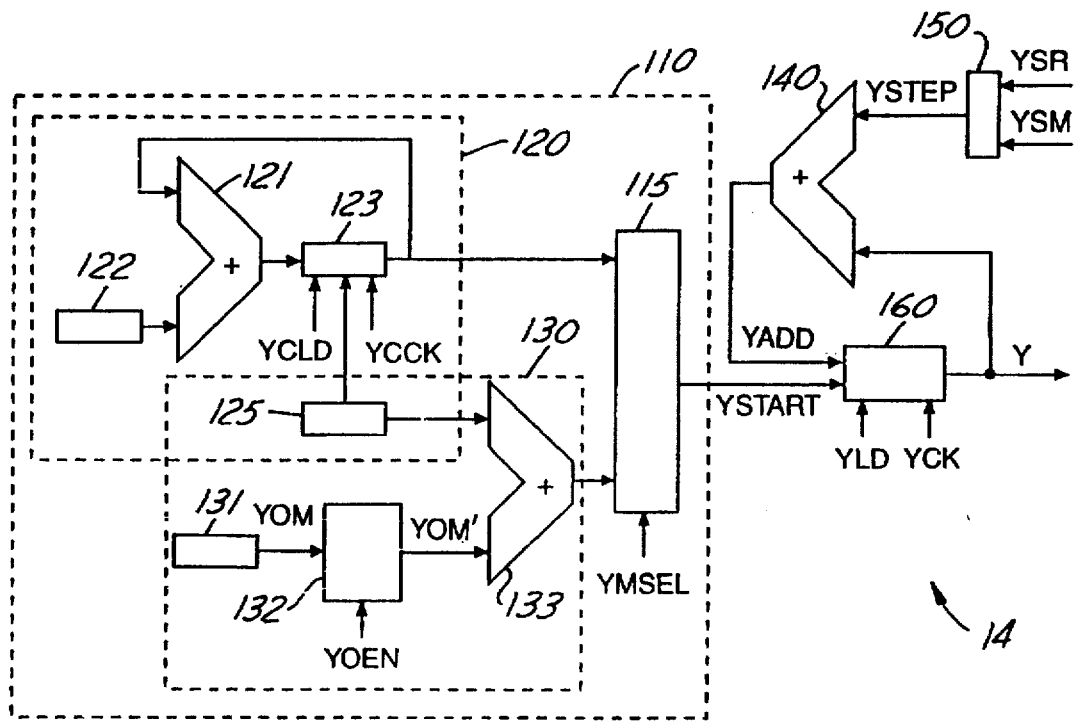
FIG. 4B is a graph showing a block diagram of the vertical position transformation circuit of the two-dimensional transformation apparatus in accordance with the present invention.

The block diagrams for a device in accordance with the present invention used for carrying out a two dimensional transformation method are shown in FIGS. 4A and 4B. A horizontal position transformation circuit 12 and a vertical position transformation circuit 14 are shown respectively in the figures and are used to transform a two dimensional screen coordinate into a graphics position coordinate (X, Y) on a per pixel basis.

As shown in FIG. 4A, circuit 12 includes a horizontal start position generator 10 for generating a graphics horizontal start position (XSTART) corresponding to a starting point of a screen scanning line, a horizontal step value generator/multiplexer 50 for generating a graphics horizontal pixel step value (XSTEP) corresponding to a desired horizontal step of a screen scanning line from either XSR (X-Step-Register written from CPU) or XSM (X-Step-Register from Memory), a horizontal position register 60 for inputting and storing the graphics horizontal start position (XSTART) and for temporarily storing a result or output from a first adder 40, the first adder 40 being provided for adding, on a per pixel basis, the horizontal pixel step value (XSTEP) and the contents of horizontal position register 60, and then outputting the result (XADD) to horizontal position register 60. Register 60 generates the graphics horizontal position (X).

As shown in FIG. 4B, circuit 14 includes a vertical start position generator 110 for generating a graphics vertical start position (YSTART) corresponding to a starting point or position of a screen scanning line, a vertical pixel step value generator/multiplexer 150 for generating a graphics vertical pixel step value (YSTEP) corresponding to a desired vertical step of a screen scanning line from either YSR (Y-Step-Register written from CPU) or YSM (Y-Step-Register from Memory), a vertical position register 160 for inputting and storing the vertical graphics start position (YSTART) and for the temporary storage of the results from a second adder 140, second adder 140 being provided for adding, on a per pixel basis, the vertical pixel step value and the contents of vertical position register 160 and then outputting the result (YADD) to the vertical position register 160. Register 160 outputs the graphics vertical position (Y).

Horizontal position register 60 is controlled by a horizontal control signal XLD to determine either to input or load the output data XSTART from horizontal start position generator 10 or whether to input the result from first adder 40. A horizontal clock signal XCK is used to trigger the input function of horizontal position register 60. Signal XCK occurs substantially in timed relation with each pixel position of each scan line.

Figure 9A:
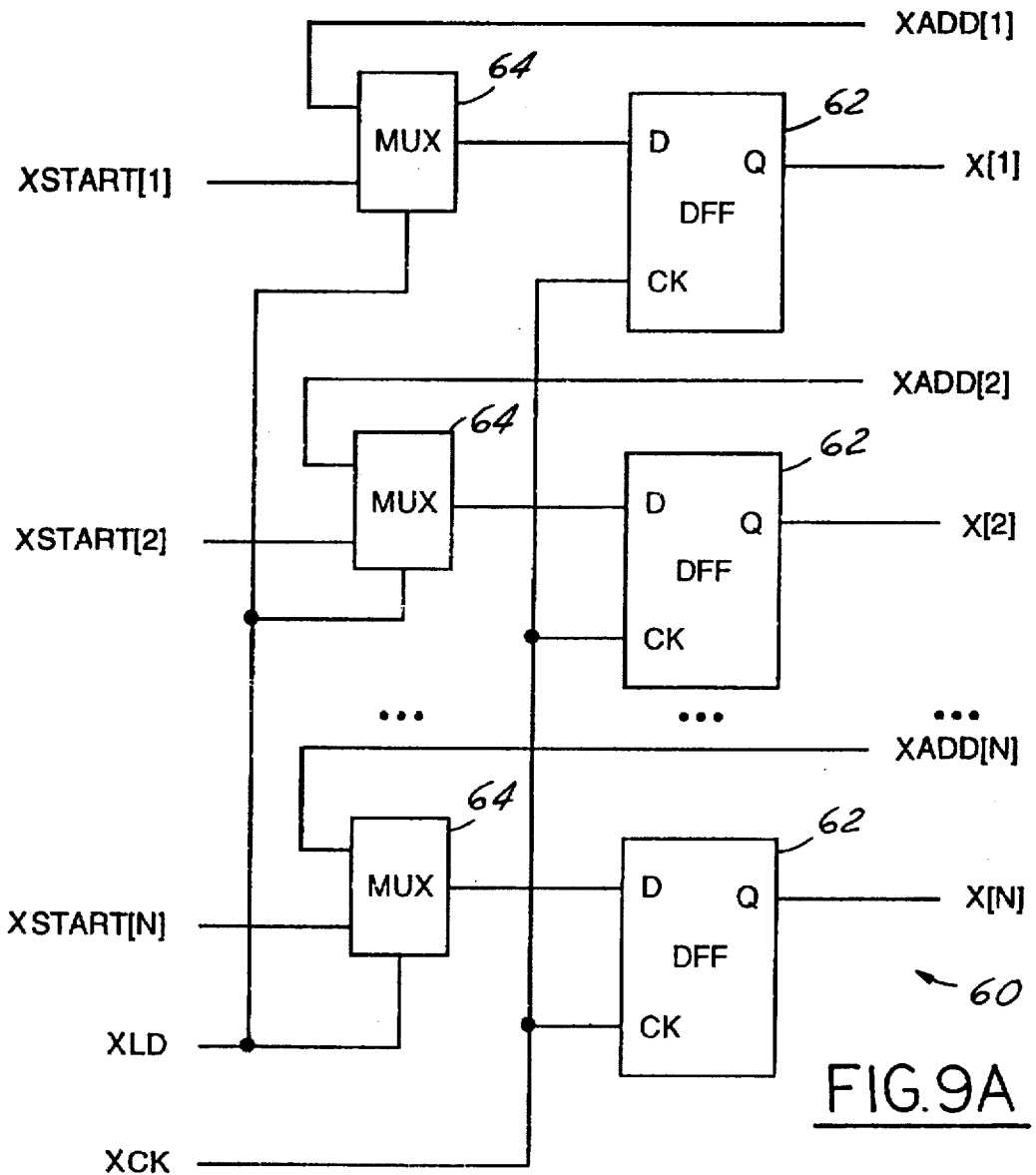
FIGS. 9A and 9B are simplified schematic and block diagram views of the horizontal and vertical position resisters, respectively, of FIGS. 4A and 4B.

FIG. 9A shows a preferred structure for implementing register 60 for an N-bit horizontal position. Register 60 includes N D-type flip flops (DFFs) 62, and N two-input multiplexers 64. The XCK input signal is connected to the clock CK input of each of the DFFs 62 to trigger the DFFs 62 to latch the data appearing on respective inputs D. Signal XLD is used to control multiplexers 64 to select either XSTART from generator 10 or XADD from adder 40. The collective output, X[N:1], defines a horizontal position X of the graphics position coordinate (X, Y).

Similarly, as shown in FIG. 4B vertical position register 60 is controlled by a vertical control signal YLD to determine whether to input or load the output data YSTART from vertical start position generator 110 or to input the result from second adder 140. A vertical clock signal YCK is used to trigger the input function of the vertical position register 160. Signal YCK occurs substantially in timed relation with each pixel position of each scan line.

Figure 9B:
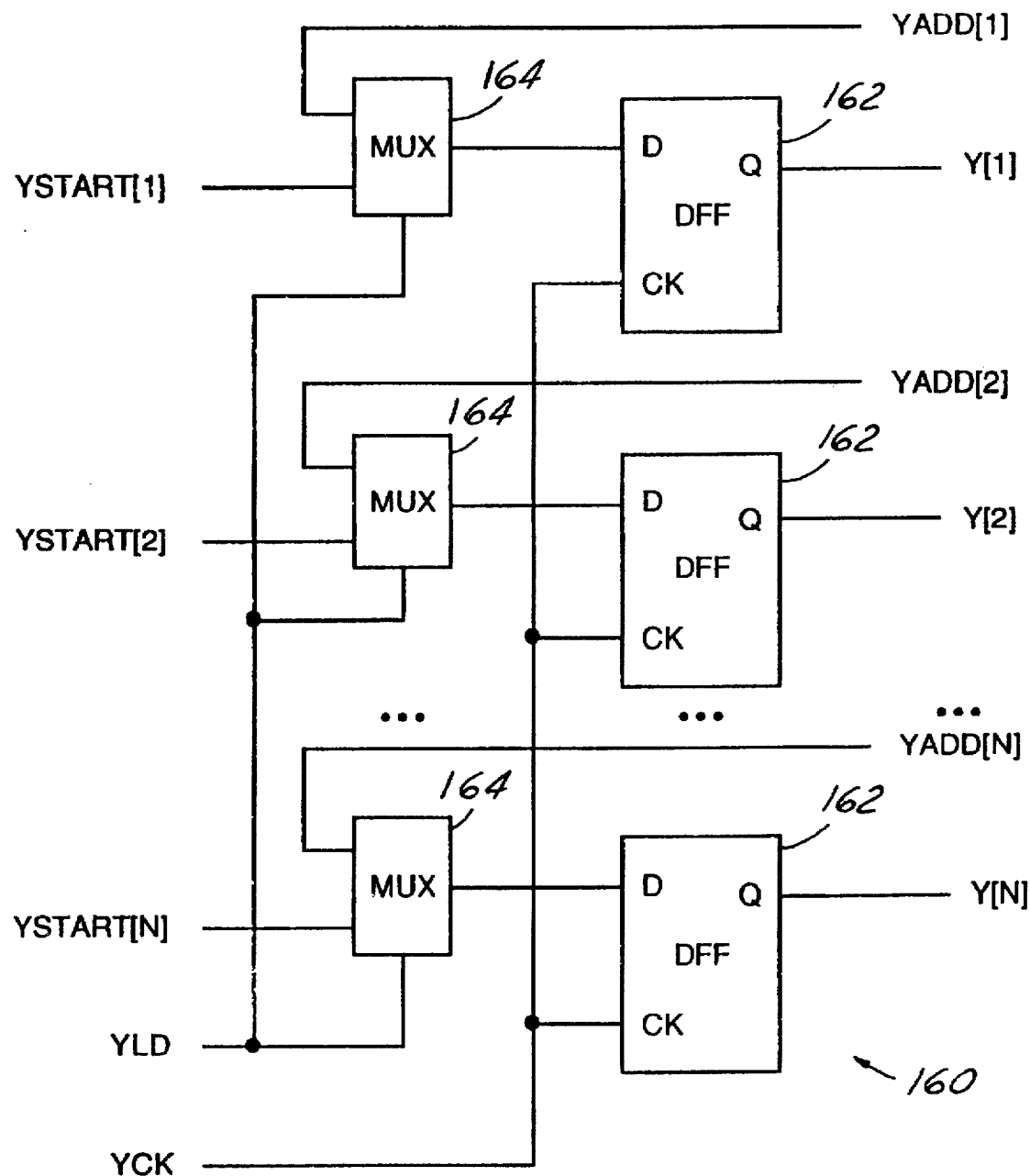

FIG. 9B shows a preferred structure for implementing register 160 for an N-bit vertical position. Register 160 includes N D-type flip flops (DFFs) 162, and N two-input multiplexers 164. The YCK input signal is connected to the clock CE input of each of the DFFs 162 to trigger the DFFs 162 to latch the data on respective inputs D. Signal YLD is used to control multiplexers 164 to select either YSTART from generator 10 or YADD from adder 40. The collective output, Y[N:1], defines a horizontal position Y of the graphics position coordinate (x, Y).

The horizontal position register 60 and the vertical position register 160 output a horizontal position X and a vertical position Y to define a graphics position coordinate (X, Y). A graphics data point is then read based on the horizontal position and the vertical position and is outputted to a display screen.

Thus, generators 10 and 110 form the means, responsive to a starting point of each scan line for generating a plurality of graphics start position coordinates (XSTART, YSTART). Adder 40, generator 50, and register 60, along with adder 140, generator 150, and register 160 form the means responsive to (XSTART, YSTART) for generating, on a per pixel basis, a graphics position coordinate (X, Y) as a function of a coordinate pixel step value (XSTEP, YSTEP) associated with each scan line.

As shown in FIG. 4A, horizontal start position generator 10 includes a first multiplexer 15 used to receive a pair of intermediate horizontal start positions or parameters and is controlled by a horizontal selection signal XMSEL to determine which to output as a horizontal graphics start position (XSTART), a first horizontal position generator 20 for generating one of the pair of intermediate horizontal start position or parameters by an automatic generation method, and a second horizontal position generator 30 for generating the other one of the pair of horizontal graphics start positions or parameters by retrieval from memory.

Signal XMSEL is preferably employed to select one of the pair of intermediate horizontal start positions or parameters on a per-screen display basis; however, a control methodology may be employed that would control signal XMSEL to make the above-mentioned selection on a scan-line basis.

The horizontal start position generator 20 includes a first horizontal register 25 for storing the horizontal graphics position with respect to the screen starting point (SPX), a second horizontal register 22 for storing an automatic horizontal accumulation step value (XCS), a third horizontal register 23 controlled by a horizontal register control signal XCLD for determining whether to input or load the value from the horizontal register 25 (for screen position of X) or to input the result from third adder 21. A horizontal register clock signal XCCK triggers the input action of the third horizontal register 23. Signal XCCK occurs at the beginning of each scan line during a horizontal blanking interval thus generating a new start position for each scan line.

A third adder 21 is provided for adding the step value from second horizontal register 22 and the contents of third horizontal register 23.

Second horizontal start position generator 30 includes first horizontal register 25 for storing a horizontal position of the screen starting point (SPX), a fourth horizontal register 31 for storing offset value data (XOM) read from an offset memory, and a fourth adder 33 for adding the contents of horizontal register 25 and the contents of fourth horizontal register 31 such that a new horizontal start position for second horizontal generator 30 can be produced. A horizontal offset control device 32 is provided for disabling fourth horizontal register 31 based on a horizontal XOFFSETBK enable signal XOEN such that the value delivered to adder 33, XOM', is made to be equal to zero.

Figure 10A:
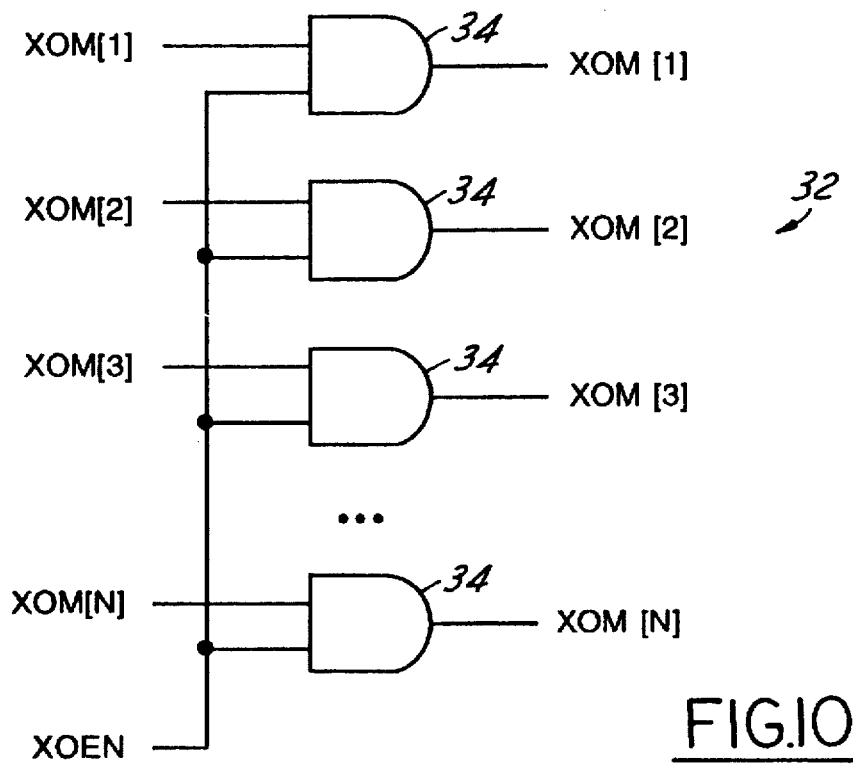
FIGS. 10A and 10B are simplified schematic diagram views of the horizontal and vertical offset control devices, respectively, of FIGS. 4A and 4B.

FIG. 10A shows the structure that may be used to implement device 32 for an N-bit horizontal-offset data value from memory XOM[N:1]. Horizontal XOFFSETBK enable signal, XOEN, is connected to each one of N Two-input AND gates 34. The other input on each one of the AND gates 34 is connected to a respective bit of the horizontal-offset data value XOM. When signal XOEN is at a logic low level, the outputs of gates 34 are also at a logic low level, wherein the output of device 34, XOM'[N:1] equals 0.

FIG. 4B, similar to FIG. 4A for the horizontal data, shows a vertical start position generator 110 that includes a third multiplexer 115 for accepting a pair of intermediate vertical start positions or parameters from multiple data handling routes and accepting a vertical selection signal YMSEL to determine or select which of the pair as the output vertical start position (YSTART), a first vertical start position generator 120 to generate a first one of the pair of intermediate vertical start positions or parameters by an automatic generating method and, a second vertical start position generator 130 for generating the other one of the pair of intermediate vertical start positions or parameters calculated from offset data stored in a memory.

Preferably, signal YMSEL is employed to select one of the pair of intermediate vertical start positions or parameters on a per-screen basis; however, a methodology may be employed to use signal YMSEL to make a selection on a scan-line basis.

First vertical start position generator 120 includes a first vertical register 125 for storing the vertical graphics position with respect to the screen starting point (SPY), a second vertical register 122 for storing a automatic vertical accumulation step value (YCS) for the automatic generating method, a third vertical register 123 that is controlled by control signal YCLD for determining either to input or load the value of first vertical register 125 or whether to input the results of a fifth adder 121. Clock signal YCCK is provided to trigger the input function of the third vertical register 123. Fifth adder 121 is provided for adding the step value inputted from second vertical register 122 to contents of third vertical register 123. Signal YCCK occurs at the beginning of each scan line.

The second vertical start position generator 130 includes first vertical register 125 for storing the vertical graphics position of a screen starting point, a fourth vertical register 131 for storing data (YON) inputted from an offset memory, a sixth adder 133 for adding the contents of first vertical register 125 and the output of fourth vertical register 131 (YOM') such that an updated vertical starting position can be generated by second vertical generator 130, and a vertical offset control device 132 for disabling fourth vertical register 131 based on a vertical Y-offset enable signal YOEN such that its value delivered to adder 133 becomes zero.

Figure 10B:
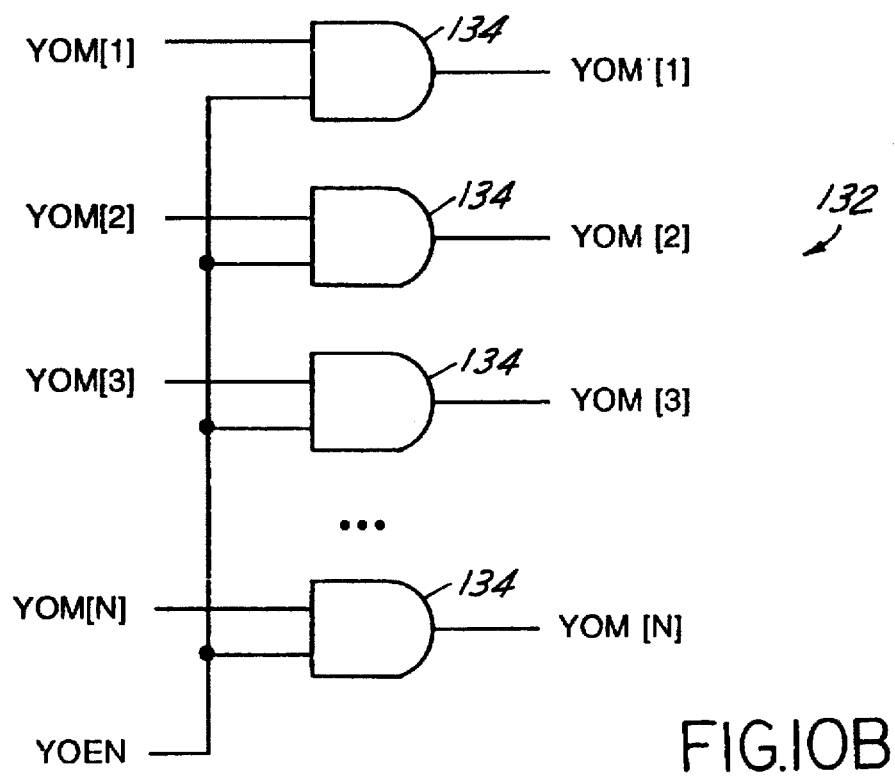

FIG. 10B shows a structure that may be used to implement device 132 for an N-bit vertical-offset data value from memory YOM [N:1], which includes N Two-input AND gates 134. Signal YOEN is connected to each of the AND gates 134, and, as should be understood by those of ordinary skill in the art, may be controlled to selectively deliver signal YOM'[N:1]equal to 0 to adder 133.

Referring now to FIGS. 4A and 4B, generators 20 and 120 thus comprise automatic accumulation means for generating a first intermediate graphics start position coordinate for each scan line according to an automatic accumulation coordinate step value (stored in registers 22, 122) and a respective starting point of a screen.

Generators 30, and 130 thus comprise offset means for generating a second intermediate graphics start position coordinate for each scan line according to an offset coordinate value retrieved from a memory.

Figure 5:
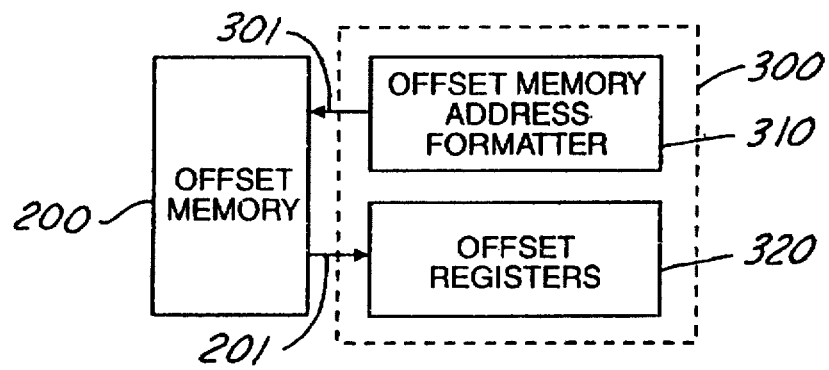
FIG. 5 is a graph showing a block diagram for the memory read device used in the present invention.

The contents of register 31, and 131, shown respectively in FIGS. 4A, and 4B, are inputted from an offset memory 200 shown in FIG. 5. A memory read device 300 is provided for use with circuits 12 and 14 for converting the scanning line position (vertical counter) to an address by way of offset memory address formatter 310. The address is provided on address bus 301, in order to read offset data from memory 200 over data bus 201 into offset registers 320. Offset registers 320 include register 31 of circuit 12, and register 131 of circuit 14. Alternatively, address formatter 310 may be selected to generate an address based on an address stored in a horizontal base register YOFFSETBK, and a vertical base register YOFFSETBK. The data retrieved from memory 200 are horizontal, and vertical position displacement values, referred to previously as horizontal and vertical offset values, respectively, which are listed in continuous order in memory 200.

FIG. 6A shows an exemplary bit format of an address generated by address formatter 310 based on the address stored in base register YOFFSETBK. As shown, the address is a 17-bit quantity, which is used to retrieve a horizontal offset value for storage in register 31 of circuit 12.

FIG. 6B shows an alternative bit format incorporating the above-mentioned scanning line position on the screen in terms of a vertical counter VC, which corresponds to a vertical position of a screen scanning line.

FIG. 7A shows an exemplary bit format generated by address formatter 310 based on vertical base register YOFFSETBK to retrieve a Y-offset for storage in register 131.

Similarly, FIG. 7B illustrates an alternative bit format employing a vertical position of a screen scanning line VC.

Figure 8A:
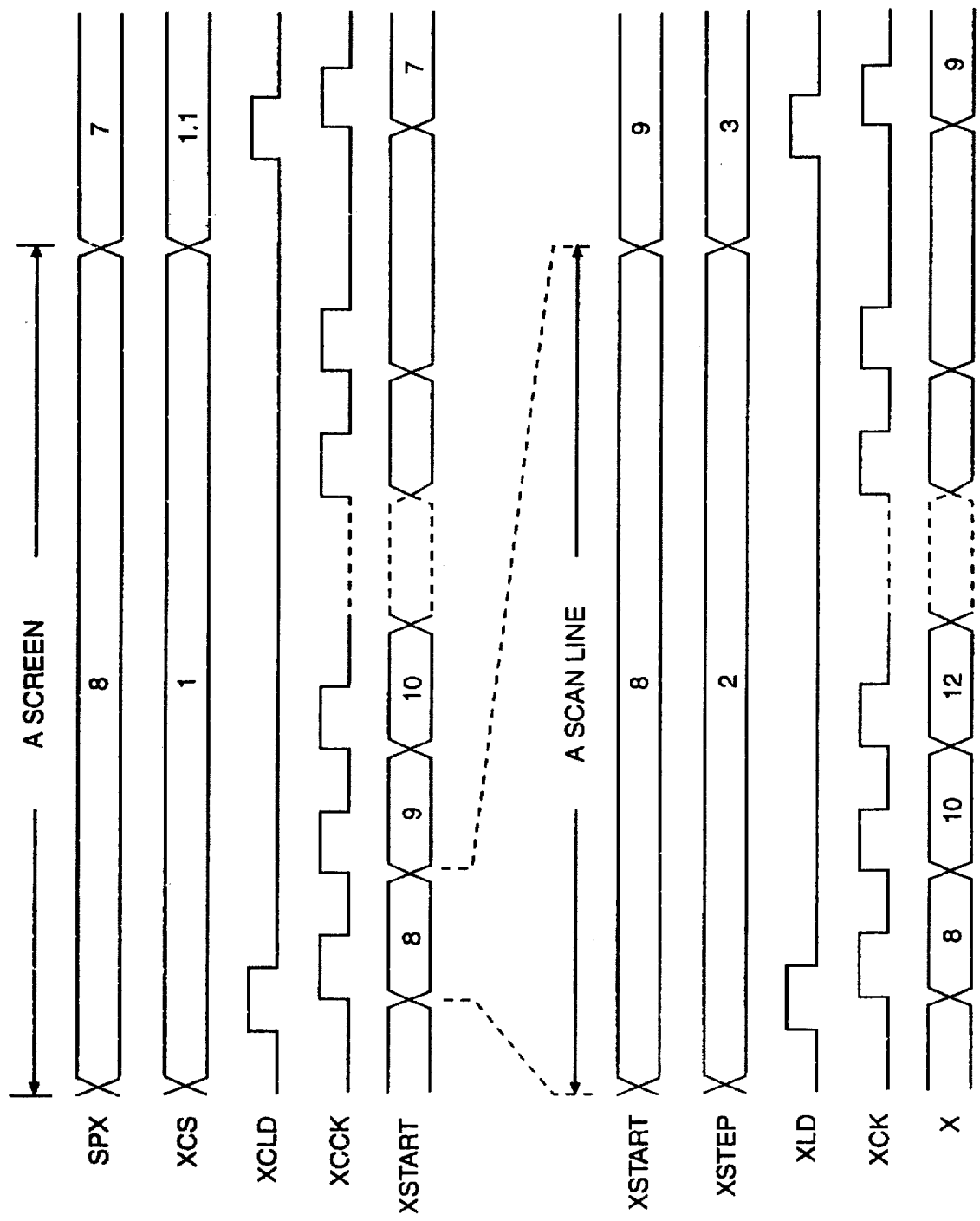
FIG. 8A and 8B are simplified timing diagram views illustrating the operation of the circuits of FIGS. 4A and 4B, respectively.
Figure 8B:
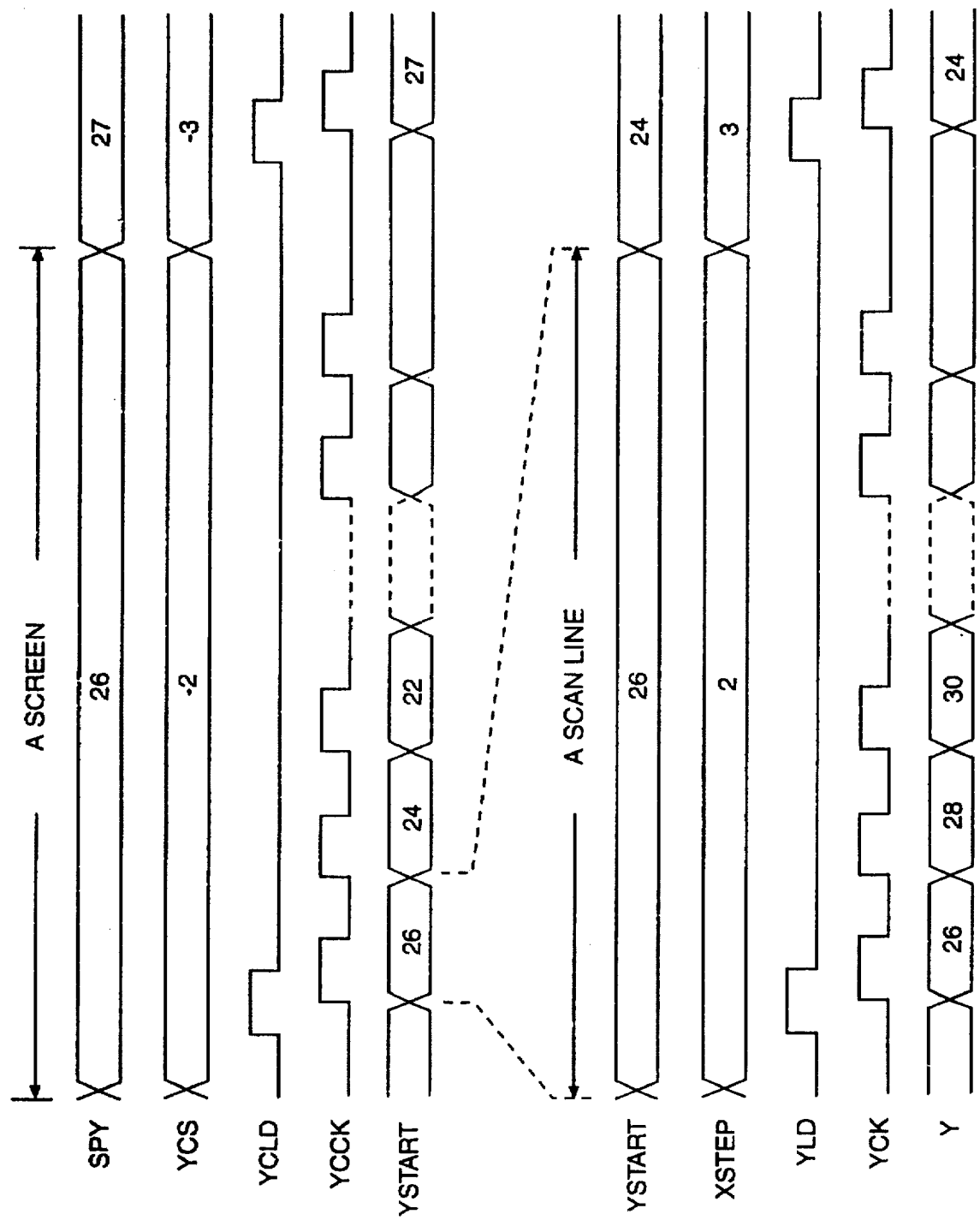

Referring now to FIGS. 8A and 8B, as well as FIGS. 4A and 4B, a description of the operation of circuits 12 and 14 will now be set forth. Assume that generators 20 and 120 have been selected for operation (i.e., the automatic accumulating methodology). First, a screen starting point corresponding to a starting point of a first scan line of the display (i.e., SPX, SPY) is selected and stored in respective registers 25, 125 (e.g., by a CPU). Next, an automatic accumulating step value (XCS, YCS) is selected and stored in respective registers 22, 122. Further, assume that signals XMSEL and YMSEL have been controlled (e.g., by a CPU) to select the output of generators 20, 120. Generators 20, 120 use the screen starting point (SPX, SPY) and the automatic accumulating step value (XCS, YCS) as follows: initially, before the first scan line, registers 23, 123 are enabled to be loaded with the value of the screen starting point held in registers 25, 125 (SPX, SPY) by appropriate assertion of signals XCLD, YCLD. After signals XCLD, YCLD have been asserted and upon the next transition of signals XCCK, YCCK, the values of SPX, SPY are clocked into registers 23, 123, and thus become the output of generators 20, 120. By way of signals XMSEL, YMSEL, the initial value for (XSTART, YSTART) is thus (SPX, SPY). After such loading, the starting point held in registers 23, 123 then becomes available to adders 21, 121. Adders 21, 121 are immediately operative to add the automatic accumulating step value (XCS, YCS) held in registers 22, 122 to the current output of registers 23, 123 (i.e., the graphics screen starting position coordinate) to generate an updated graphics starting position coordinate corresponding to the next scan line. Upon the next transition of signals XCCK, YCCK, which occur at the beginning of every scan line (during a horizontal blanking interval), the updated value appearing at the outputs of adders 21, 121 is loaded or clocked into registers 23, 123 for output through multiplexers 15, 115 to registers 60, 160. This process is repeated for each successive scan line of the screen display. For example, as shown in FIG. 8A, for SPX equal to 8 and XCS equal to 1, XSTART is initialized to a value of 8 for the first scan line, 9 for the second scan line, 10 for the third scan line, and so on. Similarly, as shown in FIG. 8B, with SPY equal to 26, and YCS equal to −2, the value of YSTART for the first scan line is 26, 24 for the second scan line, and so on.

A description of the operation of circuits 12, 14 that occurs during a scan line will now be described. With continued reference to FIGS. 8A and 8B, the first scan line of the screen will be described: accordingly, assume that the graphics start position coordinate (XSTART, YSTART) generated by generators 10, 110 is equal to (8, 26).

Further assume that generators 50, 150 have been configured so that a pixel step value (XSTEP, YSTEP) is equal to (2, 2). The pixel step value is so-called because it is applied every pixel; however, it should be clear that its value remains the same for an entire scan line. Initially, signals XLD (to register 60) and YLD (to register 160) are low. When signals XLD, and YLD are raised to a logic high state, registers 60, and 160, respectively, are enabled to receive the values for XSTART and YSTART. Upon the first rising edge of XCK, and YCK, the values of [8], and [26]are latched into registers 60, and 160, respectively. These values then become the output of registers 60, 160; effectively, the graphics position coordinate (X, Y) has now taken on the value (8, 26). Upon each rising edge of signals XCK, and YCK, which occur every pixel, registers 60, 160 accept and store as input the sum of (X, Y) from the prior pixel and the step value (2, 2), as determined by adders 40, 140, respectively. This process is repeated for each pixel of the scan line. FIGS. 8A, and 8B clearly illustrate the progression on a per pixel basis. Selection of the pixel step coordinate (2, 2) will result in a reduction of a graphic picture, as should be apparent from the foregoing description. Thus, (X, Y) progresses as follows as shown in FIGS. 8A and 8B: (8, 26), (10, 28), (12, 30), etc.

Alternatively, if circuits 12 and 14 are configured, by way of signals XMSEL, and YMSEL, to use graphics start position coordinates (XSTART, YSTART) from memory and pixel step values XSM, YSM from memory, then generators 30, 130 are of particular interest. Operation of circuits 12, 14 then occur as follows. First, a graphics start position coordinate and pixel step value (XSM, YSN) are selected for each scan line and stored in a memory. The pixel step value is so-called because it is applied every pixel; however, it should be clear that its value remains the same for an entire scan line. The graphics start position coordinates may be stored in a memory distinct from, or common to the memory used for storage of the pixel step value. Next, at the beginning of each scan line, a respective one of the graphics start position coordinates is retrieved from memory into registers 31, 131. Similarly, the pixel step value is retrieved from memory and provided to generators 50, 150 via signals XSM, YSN. The offset coordinate stored in registers 31, 131 is added to the screen starting coordinate in registers 25, 125 (SPX, SPY) by way of adders 33, 133. The resulting sum in selected through multiplexers 15, 115 and is provided as XSTART, YSTART to registers 60, 160. Finally, registers 60, 160 generate a graphics position coordinate for each pixel (X, Y) of each scan line using (XSTART, YSTART) and (XSTEP, YSTEP), as described in detail above.

It should be understood that the above description, wherein the screen starting point (SPX, SPY) stored in registers 25, 125, and the corresponding offset (XOM, YON) being stored in registers 31, 131, is but one way in which to organize this data. For example, registers 25, 125 may be initialized to 0, thus, in effect, making the value contained in registers 31, 131 the screen starting point. As a further alternative, the screen starting points may be stored in memory to be retrieved into registers 31, 131, wherein the value stored in registers 25, 125, constitute or define a displacement or offset. It should be understood that each of these alternative data handling methodologies remain within the spirit and scope of the present invention.

The present invention therefore utilizes a two dimension transformation to instantly change the direction and position of a sampling point of a scanning line in the graphics space so that the special effect of a graphics image such as rotation, enlargement or reduction can be performed.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will readily apply these teachings to other possible variations of the invention. For instance, other similar arrangements of the adders and the resisters can easily substitute those shown in the preferred embodiment while substantially accomplishing the same desirable results.

The embodiments of the invention in which an exclusive property or privilege is claimed are defined as follows:

What is claimed:

1. A coordinate conversion device suitable for use with a scan type display having a plurality of scan lines, each scan line having a plurality of pixels, said coordinate conversion device comprising:

a horizontal position transformation circuit responsive to a screen starting point of each scan line for generating a horizontal graphics position on a per pixel basis; and a vertical position transformation circuit responsive to said screen starting points for generating a vertical graphics position on a per pixel basis;

said horizontal position transformation circuit comprising:

a horizontal start position generator for generating a respective graphics horizontal start position corresponding to said starting points;

a horizontal step value generator for generating a graphics horizontal step value associated with each scan line;

a first adder having an output for adding, on a per pixel basis, said horizontal step value and said horizontal graphics position;

a horizontal position register responsive to said graphics horizontal start position and said output of said first adder for generating said horizontal graphics position; and said vertical position transformation circuit comprising:

a vertical start position generator for generating a respective graphics vertical start position corresponding to said starting points;

a vertical step value generator for generating a graphics vertical step value associated with each scan line;

a second adder having an output for adding, on a per pixel basis, said vertical step value and said vertical graphics position; and a vertical position register responsive to said graphics vertical start position and said output of said second adder for generating said vertical graphics position;

said horizontal start position generator including:

a first horizontal position generator responsive to said starting points for generating a respective first horizontal parameter according to an automatic horizontal accumulation step value;

a second horizontal position generator responsive to said starting points for generating a respective second horizontal parameter according to a horizontal offset from a first memory;

a first multiplexer for selecting, on a screen display basis according to a first horizontal selection control signal, one of said first and said second horizontal parameters to generate said graphics horizontal start position;

said vertical start position generator including:

a first vertical position generator for generating a first vertical parameter according to an automatic vertical accumulation step value;

a second vertical position generator for generating a second vertical parameter according to a vertical offset from a second memory; and a second multiplexer for selecting, on a screen display basis according to a first vertical selection control signal, one of said first and said second vertical parameters to generate said graphics vertical start position.

2. The device of claim 1, wherein said horizontal position register is responsive to a second horizontal selection control signal (XLD) for selecting one of said graphics horizontal start position and said output of said first adder for output as said horizontal graphics position, said horizontal selection being triggered by a first horizontal clock signal, and wherein said vertical position register is responsive to a second vertical selection control signal (YLD) for selecting one of said graphics vertical start position and said output of said second adder for output as said vertical graphics position, said vertical selection being triggered by a first vertical clock signal.

* * * * *